(12) United States Patent
Leung

(10) Patent No.: US 9,278,627 B2
(45) Date of Patent: Mar. 8, 2016

(54) PLANAR ELECTRIC GENERATOR

(71) Applicant: Plane Flat Generator Development Co. Limited, Hong Kong (HK)

(72) Inventor: Sik Kau Leung, Hong Kong (HK)

(73) Assignee: PLANE FLAT GENERATOR DEVELOPMENT CO. LIMITED, Hong Kong (HK)

( * ) Notice: Subject to any disclaimer, the term of this patent is extended or adjusted under 35 U.S.C. 154(b) by 0 days.

(21) Appl. No.: 14/557,473

(22) Filed: Dec. 2, 2014

(65) Prior Publication Data

US 2015/0151649 A1    Jun. 4, 2015

(30) Foreign Application Priority Data

Dec. 2, 2013  (CN) .......................... 2013 1 0629455

(51) Int. Cl.
| | |
|---|---|
| H02K 19/16 | (2006.01) |
| B60L 13/04 | (2006.01) |
| F03D 9/00 | (2006.01) |
| F03D 5/04 | (2006.01) |
| B60L 8/00 | (2006.01) |
| H02K 7/18 | (2006.01) |

(52) U.S. Cl.
CPC ................. B60L 13/04 (2013.01); B60L 8/006 (2013.01); F03D 5/04 (2013.01); F03D 9/002 (2013.01); H02K 7/183 (2013.01); H02K 7/1869 (2013.01); B60L 2200/26 (2013.01); Y02E 10/70 (2013.01); Y02E 10/72 (2013.01); Y02T 10/16 (2013.01)

(58) Field of Classification Search
CPC ..... H02K 19/16; H02K 7/183; H02K 7/1869; B60L 13/04; B60L 18/006; F03D 5/04

USPC .................................................. 104/281–284
See application file for complete search history.

(56) References Cited

U.S. PATENT DOCUMENTS

| | | | | |
|---|---|---|---|---|
| 3,435,267 A * | 3/1969 | Bering | ...................... | H02K 1/06 310/168 |
| 2001/0030487 A1* | 10/2001 | Higashino | ................ | H02K 9/06 310/263 |
| 2006/0208603 A1* | 9/2006 | Kerlin, IV | .............. | H02K 1/146 310/261.1 |
| 2010/0301689 A1* | 12/2010 | Hayashi | ................... | H02K 9/06 310/62 |
| 2011/0291413 A1* | 12/2011 | Wamble, III | ............ | B60L 13/04 290/44 |
| 2013/0106193 A1* | 5/2013 | Bryson | ................... | F03D 9/007 307/73 |
| 2015/0102605 A1* | 4/2015 | Giengiel | ................. | F03D 9/002 290/55 |
| 2015/0151649 A1* | 6/2015 | Leung | ..................... | B60L 13/04 104/282 |
| 2015/0180288 A1* | 6/2015 | Roer | ...................... | H02K 19/16 290/55 |
| 2015/0288267 A1* | 10/2015 | Gudewer | ............... | H02K 15/02 290/55 |

\* cited by examiner

*Primary Examiner* — Jason C Smith

(57) ABSTRACT

A planar electric generator using a magnetic levitation system includes an annular ferromagnetic guide rail and a rotary disk located above the annular ferromagnetic guide rail. The annular ferromagnetic guide rail includes an annular base and two annular wheel rails that protrude upward from the annular base and separated from each other. A plurality of first electromagnets protrudes between the two annular wheel rails. The first electromagnets are distributed at an equal interval around a circumferential direction of the annular base. An electromagnetic induction apparatus is provided at the top of each first electromagnet.

10 Claims, 4 Drawing Sheets

PLANAR ELECTRIC GENERATOR

CROSS REFERENCE TO RELATED PATENT APPLICATIONS

The present patent application claims benefit of Chinese patent application No. 201310629455.5 filed on Dec. 2, 2013, the entire contents are incorporated by reference.

TECHNICAL FIELD

The present patent application relates to an electricity generation apparatus, and particularly to a planar electric generator using a magnetic levitation technology.

BACKGROUND

An electric generator is a mechanical device that converts energy sources in other forms into electric energy, and is driven by a water turbine, a steam/gas turbine, a diesel engine or other dynamical machines. Energy generated from water flows, gas flows, fuel combustion or nuclear fission is converted into mechanical energy. The mechanical energy is transferred to the electric generator, and the electric generator then converts the mechanical energy into electric energy. Electric generators have been used widely in industrial and agricultural production, national defense, science and technology, and daily life.

A general principle of constructing an electric generator is as follows: Suitable magnetically conductive and electrically conductive materials are used to form a magnetic circuit and an electrical circuit that perform electromagnetic induction with each other to generate electromagnetic power to achieve an objective of energy conversion. At present, a general electric generator includes a stator and a rotator. The rotator rotates in the stator to make movement of cutting magnetic field lines, so as to generate induced potential, which is led out through a connecting terminal and is connected in a loop, so as to generate a current.

In such a manner where magnetic field lines are cut by means of that a rotator rotates around a stator, a rotating shaft is essential. It causes problems of shaft wear, vibration, and heat dissipation. A frictional force of a shaft also causes unnecessary loss. At present, other auxiliary apparatuses need to be provided to solve these problems. It increases a fabrication cost. If these auxiliary apparatuses are not used, the service life of an electric generator is greatly shortened.

SUMMARY

A technical problem to be solved by the present patent application is to provide a planar electric generator, where a rotational movement in a magnetic levitation state enables magnetic field lines to pass through an electromagnetic induction apparatus to generate a change to generate electricity under the effects of an external wind force or a discharging force. The rotational movement of the planar electric generator has a small frictional force, low power consumption and low loss.

The present patent application provides a planar electric generator includes an annular ferromagnetic guide rail and a rotary disk located above the annular ferromagnetic guide rail. The annular ferromagnetic guide rail includes an annular base, two annular wheel rails separated from each other. A plurality of first electromagnets and a plurality of electromagnetic induction apparatuses for generating electricity are provided at a top of each first electromagnets. The rotary disk located above the annular ferromagnetic guide rail includes two wheels in rolling cooperation with the annular wheel rails and being respectively installed at two sides of a bottom of the rotary disk, a plurality of second electromagnets and a plurality of trumpet-shaped wind catching cups being fixed at a top of the rotary disk.

The rotary disk and the annular ferromagnetic guide rail cooperate to generate a magnetic levitation force and propelling force. The two annular wheel rails protrude upward from the annular base. The first electromagnets protrude between the two annular wheel rails. The second electromagnets protrude downward between the two wheels. The first electromagnets and the second electromagnets generate magnetic field lines passing through the electromagnetic induction apparatuses.

The wind catching cups (blades, vanes) collectively guide wind for use as a driving force on the rotary disk. An opening direction of each wind catching cups is tangent to a circumferential direction of the annular base.

The wind catching cups push the rotary disk to start to rotate along the circumferential direction of the annular base under the effect of an external wind force. The wheels and the annular wheel rails are in rolling cooperation. The rotary disk rotates along the circumferential direction of the annular base under the effects of the magnetic levitation force of the first electromagnets and the second electromagnets and a propelling force on the wind catching cups from wind.

The magnetic field lines passing through the electromagnetic induction apparatuses change to produce an electromotive force to generate electricity and recycle electric energy for driving magnetic levitation of a train. The rotary disk is levitated above the annular ferromagnetic guide rail, and the wheels leave the annular wheel rails.

The rotary disk is an integral continuous annular disk. The second electromagnets are distributed at an equal interval at the bottom of the rotary disk around the circumferential direction of the rotary disk. The interval between adjacent second electromagnets is equal to an interval between adjacent first electromagnets.

The wind catching cups are odd-numbered and are distributed at an equal interval around the circumferential direction of the rotary disk. The wind catching cups are axially symmetric about a central axis of the rotary disk.

The planar electric generator further comprises a plurality of the rotary disks which are odd-numbered. The rotary disks are distributed at an interval around the circumferential direction of the annular base. Each of the wind catching cups is fixed at a top of each rotary disk.

The second electromagnets are respectively distributed at an equal interval at the bottom of each rotary disk around the circumferential direction of the annular base, and the interval between adjacent second electromagnets is equal to an interval between adjacent first electromagnets.

A plurality of first permanent magnets are respectively provided at a front end and a rear end in a circumferential rotation direction of the rotary disk. Opposing ends of two first permanent magnets on adjacent rotary disks repel each other.

The electromagnetic induction apparatus comprises a double-sided electromagnet and an electric generator component.

The two annular wheel rails and the annular base are integrated and are both second permanent magnets. Symmetric protective wings protrude downward outside the wheels of the rotary disk. A plurality of third permanent magnets is provided at inner sides of the two protective wings and a bottom surface of the rotary disk. Opposing ends of the third permanent magnet and the second permanent magnet repel each other.

The planar electric generator further includes a wind accumulation funnel for accumulating an external wind flow being provided outside the annular ferromagnetic guide rail. The wind accumulation funnel comprises a big opening facing outward and a small opening facing a top of the rotary disk.

The present patent application also provides a planar electric generator includes a straight-line ferromagnetic guide rail and a train located above the straight-line ferromagnetic guide rail. The straight-line ferromagnetic guide rail includes a plurality of cross-ties, two straight-line wheel rails separated from each other, a plurality of first electromagnets; and a plurality of electromagnetic induction apparatuses for generating electricity being provided at a top of each first electromagnet. The train includes two wheels that are respectively in rolling cooperation with the straight-line wheel rails being installed at two sides of the bottom of the train, a plurality of second electromagnets; and a trumpet-shaped wind catching cup being fixed at a top of the train.

The train and the straight-line ferromagnetic guide rail cooperate to generate a magnetic levitation force and propelling force.

The two straight-line wheel rails protrude upward from the cross-ties. The first electromagnets protrude between the two straight-line wheel rails. The first electromagnets are distributed at an equal interval along a longitudinal direction of the straight-line ferromagnetic guide rail. The first electromagnets and the electromagnetic induction apparatuses form a first straight-line electricity-generation ferromagnetic guide rail.

The second electromagnets and the first electromagnets generate the magnetic levitation force and the propelling force. The second electromagnets protrude downward between the wheels at two sides of the bottom of the train. The second electromagnets extend along a longitudinal direction of the train to form a second straight-line electricity-generation ferromagnetic guide rail.

The first electromagnets correspond to the second electromagnets. The first electromagnets and the second electromagnets produce magnetic field lines. The magnetic field lines pass through the electromagnetic induction apparatuses to form a straight-line electricity generation component.

An opening direction of the wind catching cup is opposite a travel direction of the train.

The wind catching cup pushes the train to start to rotate along the longitudinal direction of the straight-line ferromagnetic guide rail under the effect of an external wind force; the wheels and the straight-line wheel rails are in rolling cooperation; the train moves along the longitudinal direction of the straight-line ferromagnetic guide rail under the effects of the magnetic levitation force and propelling force of the first electromagnets and the second electromagnets; the magnetic field lines passing through the electromagnetic induction apparatuses change to generate an electromotive force to generate electricity and recycle electric energy for driving magnetic levitation of the train; and the train is levitated above the straight-line ferromagnetic guide rail, and the wheels leave the straight-line wheel rails.

Compared with the prior art, advantages of the present patent application are as follows:

(1) In the present patent application, a rotary disk starts under an effect of a wind-catching propelling force of a wind catching cup, and rotates, by means of a forward moving force of a train, a wind force or a flowing force of gas that requires to be discharged through combustion of a diesel engine, and under the effects of the magnetic levitation force and propelling force from electrified first electromagnets and second electromagnets acting on each other, accordingly around an annular base in a circumferential direction. Since changes keep occurring to electromagnetic fields of the first electromagnets and the second electromagnets, changes keep occurring to magnetic field lines passing through electromagnetic induction apparatuses, so as to correspondingly generate an electromotive force to implement electricity generation. The rotary disk is only subject to loss of wind resistance and loss of cutting magnetic field lines during rotation. A frictional force of movement is small. Unnecessary loss during energy conversion is greatly reduced, and electricity may be continuously generated under the effect of a continuous external wind source.

(2) In the present patent application, wind catching cups are odd-numbered, so as to keep at least one wind catching cup to be in a windward state of effectively pushing the rotary disk to rotate. This facilitates continuous and stable rotation of the rotary disk in a circumferential direction.

(3) After different currents are provided, the separately disposed first electromagnets and second electromagnets of the present patent application generate electromagnetic fields of different magnitude. It enables the first electromagnets and the second electromagnets in a forward direction to be accordingly attracted to move forward. It further facilitates continuous and stable rotation of the rotary disk in a circumferential direction.

(4) Opposing ends of second permanent magnets and third permanent magnets of the present patent application repel each other. It achieves effective and automatic balance adjustment of the rotary disk above the annular base. It further reduces frictional loss that occurs when wheels and annular wheel rails are used as a balance condition. It generates electricity at minimum energy loss.

BRIEF DESCRIPTION OF THE DRAWINGS

The present patent application is further described below in detail with reference to the accompanying drawings.

Figure 1:
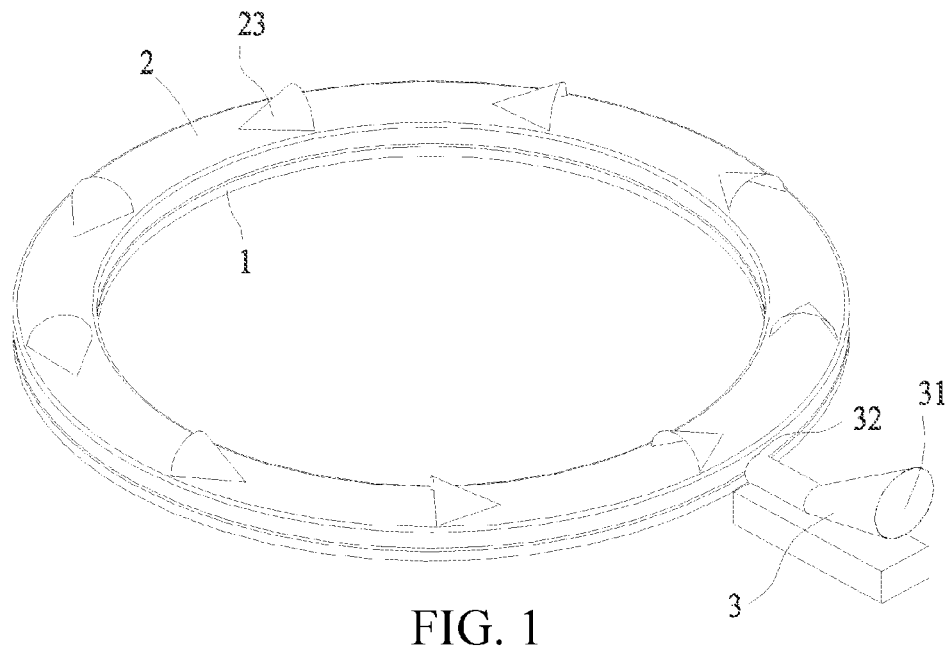
FIG. 1 is a perspective view of a planar electric generator using a magnetic levitation system according to Embodiment 1 of the present patent application.

In the drawings: 1: annular ferromagnetic guide rail; 11: annular base; 12: annular wheel rail; 13: first electromagnet; 14: electromagnetic induction apparatus; 2: rotary disk; 21: wheel; 22: second electromagnetic apparatus; 23: wind catching cup; 24: protective wing; 25: third permanent magnet; 26: first permanent magnet; 3: wind accumulation funnel; 31: big opening; 32: small opening; 4: cross-tie; 5: straight-line wheel rail; 6: straight-line ferromagnetic guide rail

DETAILED DESCRIPTION

Embodiment 1

A planar electric generator using a magnetic levitation system shown in FIG. 1 includes an annular ferromagnetic guide rail 1 and a rotary disk 2 located above the annular ferromagnetic guide rail 1. The rotary disk 2 and the annular ferromagnetic guide rail 1 cooperate to generate a magnetic levitation force and propelling force. The planar electric generator here refers to an electric generator where an electromagnet generates a current to generate electricity under the effect of relative movement on a plane.

Figure 2:
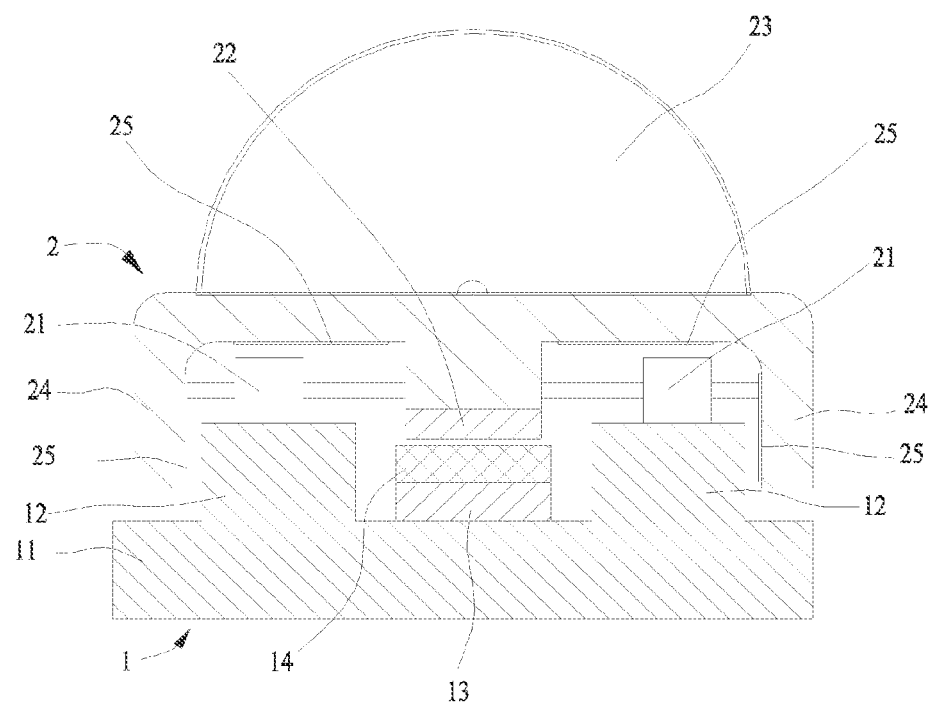
FIG. 2 is a sectional view illustrating a rotary disk cooperates with an annular ferromagnetic guide rail according to the present patent application.
Figure 3:
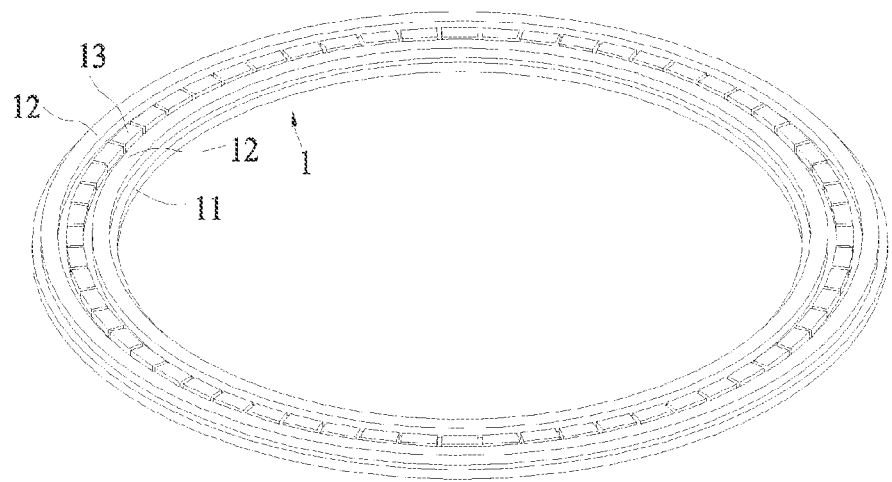
FIG. 3 is a perspective view of the annular ferromagnetic guide rail according to the present patent application.

As shown in FIG. 3, the annular ferromagnetic guide rail 1 includes an annular base 11 and two annular wheel rails 12 that are separated from each other and protrude upward from the annular base 11. A plurality of first electromagnets 13 for generating the magnetic levitation force protrudes between the two annular wheel rails 12. The first electromagnets 13 are distributed at an equal interval around a circumferential direction of the annular base 11. An electromagnetic induction apparatus 14 for generating electricity is provided at the top of each first electromagnet 13. As shown in FIG. 2, wheels 21 that are respectively in rolling cooperation with the annular wheel rails 12 are installed at two sides of the bottom of the rotary disk 2. Second electromagnets 22 that directly generate the magnetic levitation force and propelling force with the first electromagnets 13 protrude downward between the wheels 21 at two sides of the bottom of the rotary disk 2. Magnetic field lines are generated between the first electromagnets 13 and the second electromagnets 22. The magnetic field lines pass through the electromagnetic induction apparatus 14. A trumpet-shaped wind catching cup 23 is fixed at the top of the rotary disk 2. The wind catching cup 23 is used for collectively guide wind for use as a driving force on the rotary disk. An opening direction of the wind catching cup 23 is tangent to the circumferential direction of the annular base 11.

The wind catching cup 23 pushes the rotary disk 2 to start to rotate along the circumferential direction of the annular base 11 under the effect of an external wind force. The wheels 21 are in rolling cooperation with the annular wheel rails 12. Next, the rotary disk 2 rotates along the circumferential direction of the annular base 11 under the effects of the magnetic levitation force of the first electromagnets 13 and the second electromagnets 22 and a propelling force on the wind catching cup from wind. Changes occur to the magnetic field lines passing through the electromagnetic induction apparatuses 14, so that an electromotive force is generated to generate electricity. The electric energy is recycled for driving magnetic levitation of a train. After the magnetic levitation force generated by the first electromagnets 13 and the second electromagnets 22 is sufficient to support the weight of the rotary disk 2, the rotary disk 2 is levitated above the annular ferromagnetic guide rail 1, and the wheels 21 leave the annular wheel rails 12.

The electromagnetic induction apparatus 14 includes a double-sided electromagnet (not shown) and an electric generator component (not shown) for forming an electric generator with the double-sided electromagnet. The electromagnetic induction apparatus 14 uses a conventional electromotive force generated from changes of magnetic field lines to implement electricity generation in an electromagnetic induction manner. The wind catching cup 23 may also be disposed to be symmetric apparatuses such as blades and vanes that can generate a dynamic force after contact with wind.

The planar electric generator using a magnetic levitation system may be placed at an air inlet of an exhaust pipe of an engine, where an exhaust pressure is produced at an air exhaust position of a diesel-combustion electricity generation machine, enabling the rotary disk to rotate to produce an electricity generation function. Or, the planar electric generator using a magnetic levitation system may also be disposed at a seaside or grassland having a continuous wind source.

After the wind catching cup 23 catches wind under a wind force to push the rotary disk 2, the first electromagnets 13 and the second electromagnets 22 are electrified at the same time. The magnitude and direction of a current that is passed through the first electromagnets 13 and the second electromagnets 22 are controlled to generate the magnetic levitation force and propelling force, so that the wheels 21 leave the annular wheel rails 12 as soon as possible to reduce rolling wear. When supply of electricity to the first electromagnets 13 and the second electromagnets 22 is stopped, the magnetic levitation force between the first electromagnets 13 and the second electromagnets 22 disappears. The wheels 21 and the annular wheel rails 12 exert a backup rolling support effect. In this case, if the wind force is sufficient, it may also be directly used for electricity generation. In addition, the wheels 21 and the annular wheel rails 12 may also exert balance support and adjustment effects when the rotary disk 2 is subject to the effect of an unstable external force. The magnetic levitation here is an existing conventional magnetic levitation technology, which is no longer elaborated herein.

As shown in FIG. 1 to FIG. 3, the rotary disk 2 in this embodiment is an integral continuous annular disk. The second electromagnets 22 are distributed at an equal interval around a circumferential direction of the rotary disk 2 at the bottom of the rotary disk 2. An interval between adjacent second electromagnets 22 is equal to an interval between adjacent first electromagnets 13. The rotary disk 2 having an annular shape enables the first electromagnets 13 to stay contacting the second electromagnets 22 with a relatively large area, which helps to generate an electrical source output with relatively high power, and also helps the rotary disk 2 to achieve more stable rotation support.

To keep at least one of the wind catching cups 23 to do effective work under the effect of a wind force and prevent cancellation between a windward effect and a leeward effect of the wind catching cup 23, the wind catching cups 23 in this embodiment are odd-numbered, and are distributed at an equal interval around the circumferential direction of the rotary disk 2, and the wind catching cups 23 are axially symmetric about a central axis of the rotary disk 2.

A person skilled in the art may understand that the electromagnetic induction apparatus 14 may also be set as an electricity generation apparatus that is formed of common electricity generation circuits and components in a manner of an induction coil or a permanent magnetic electromagnet.

To further ensure the stability and balance of rotation of the rotary disk 2 in the circumferential direction, the two annular wheel rails 12 and the annular base 11 are integrated and are both second permanent magnets, which are made of permanent magnet materials. Symmetric protective wings 24 protrude downward outside the wheels 21 of the rotary disk 2. Third permanent magnets 25 are provided at inner sides of two protective wings 24 and the bottom surface of the rotary disk 2. Opposing ends of the third permanent magnets 25 and the second permanent magnets repel each other. Under the effect of repelling forces between opposing ends of the second permanent magnets and the third permanent magnets, effective balance adjustment may be achieved for the rotary disk 2, thereby reducing frictional loss. Meanwhile, the two protective wings 24 also exert an effect of automatic balance adjustment of symmetry of the rotary disk 2.

Figure 4:
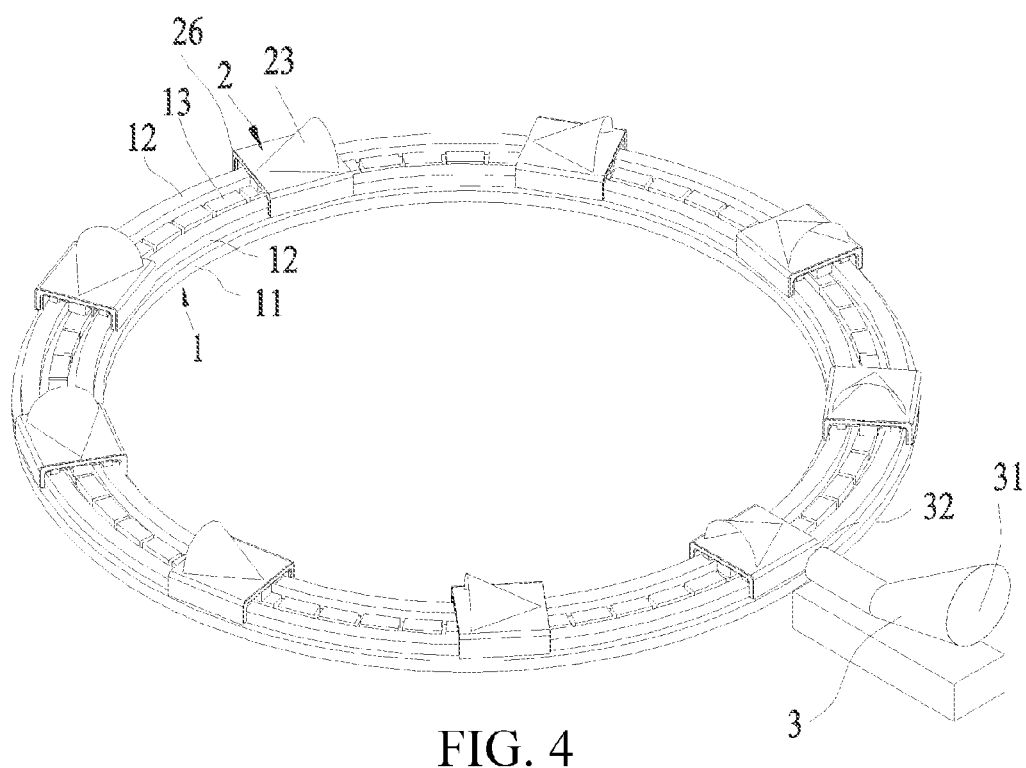
FIG. 4 is a perspective view of a planar electric generator using a magnetic levitation system according to Embodiment 2 of the present patent application.
Figure 5:
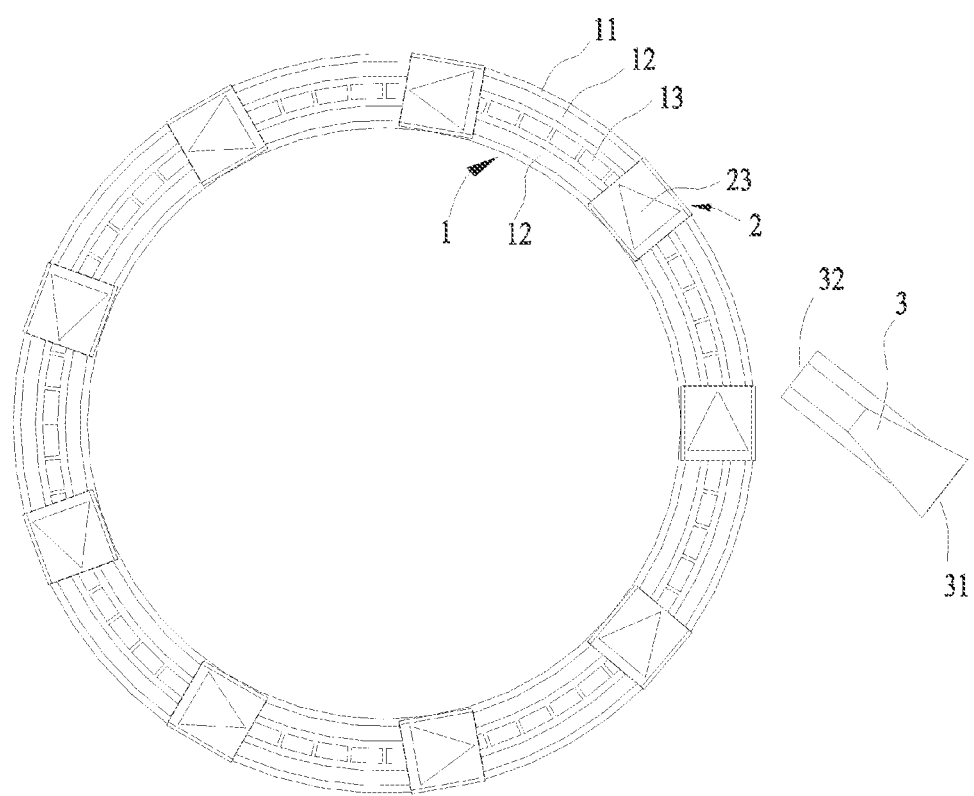
FIG. 5 is a top view of the planar electric generator using a magnetic levitation system according to Embodiment 2 of the present patent application.

To enable the wind catching cups 23 of a planar electric generator disposed at a seaside or a grassland to obtain effective windward propelling forces, as shown in FIG. 1, a wind accumulation funnel 3 for accumulating an external wind flow is provided outside the annular ferromagnetic guide rail 1. The wind accumulation funnel 3 has a big opening 31 facing outward and a small opening 32 facing the top of the rotary disk 2. The wind accumulation funnel 3 accumulates the external wind flow by using the big opening 31 and blows, through the small opening 32. A wind flow where high pressure is generated to one wind catching cup 23 at the top of the rotary disk 2, so as to enable the wind catching cups 23 to obtain windward propelling forces one by one, thereby reducing leeward wind resistance of the wind catching cups 23. The small opening 32 may face straightly the opening of the wind catching cup 23 (as shown in FIG. 5), or may also deviate and incline slightly from the opening of the wind catching cup 23 (as shown in FIG. 1 and FIG. 4).

Embodiment 2

FIG. 2 and FIG. 3, FIG. 4 and FIG. 5 show a planar electric generator using a magnetic levitation system according to Embodiment 2 of the present patent application. Differences of Embodiment 2 from Embodiment 1 lie in that:

The rotary disks 2 are odd-numbered. The rotary disks 2 are independently distributed at an interval around a circumferential direction of an annular base 11. A wind catching cup 23 is fixed at the top of each rotary disk 2. Second electromagnets 22 are distributed at an equal interval respectively around the circumferential direction of the annular base 11 at the bottom of each rotary disk 2. An interval between adjacent second electromagnets 22 is equal to an interval between adjacent first electromagnets 13. First permanent magnets 26 are respectively provided at a front end and a rear end in a circumferential rotation direction of the rotary disk 2. Opposing ends of the two first permanent magnets 26 on adjacent rotary disks 2 repel each other.

Under the effect of a magnetic levitation force and propelling force of the first electromagnets 13 and the second electromagnets 22, each rotary disk 2 is respectively rotatable in a circumferential direction of the annular base 11. An external wind force can push the rotary disks 2 one by one, so that a wind force can be used more effectively. Meanwhile, the first permanent magnets 26 may also prevent adjacent rotary disks 2 from colliding with each other.

Figure 6:
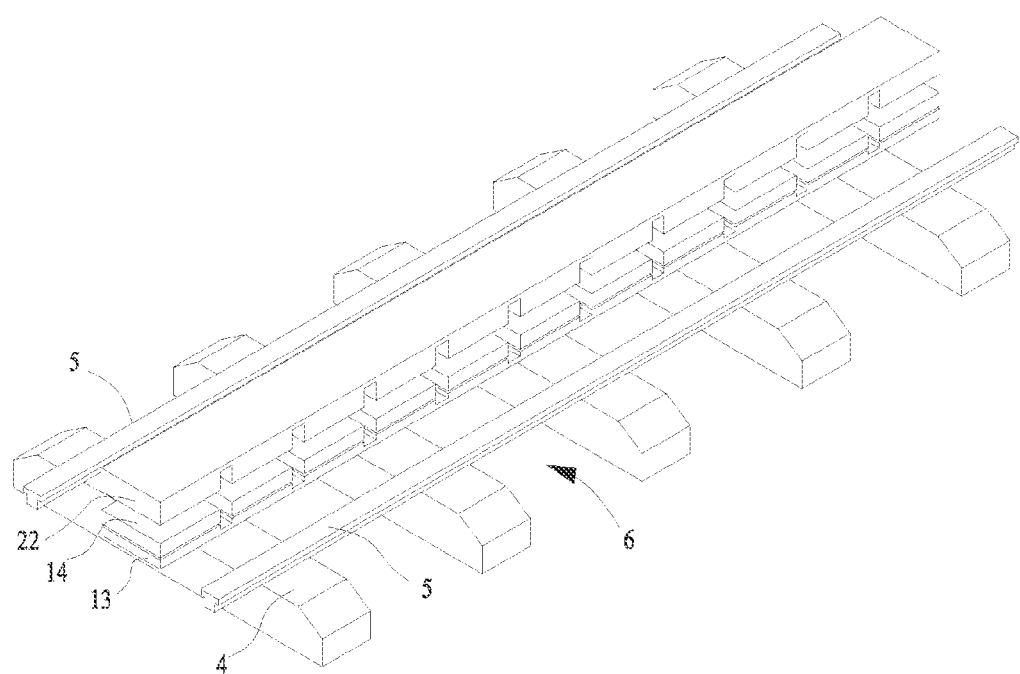
FIG. 6 illustrates another embodiment of a planar electric generator using a magnetic levitation system according to the present patent application.

The diameter of an annular ferromagnetic guide rail 1 may also be increased infinitely, so that a section of the annular ferromagnetic guide rail 1 presents a nearly straight line-form. This is applicable to a track rail in a magnetic levitation conveyance system. The rotary disk 2 is equivalent to a train in the magnetic levitation conveyance system. The first electromagnets 13 and electromagnetic induction apparatuses 14 are disposed in parallel at an interval in the middle or center of cross-ties between two track rails, and also present a straight-line form as the track rails. The first electromagnets 13 may be permanent magnets or wire-wound charging electromagnets. The second electromagnets 22 are installed at the bottom of the train and are pulled forward by means of an existing electric train, and produce electromagnetic friction with the first electromagnets 13 below. Magnetic induction lines are cut to generate a current and changing electromagnetic fields are formed between the first electromagnets 13 and the second electromagnets 22. The electromagnetic induction apparatuses generate an electromotive force to achieve accumulation of currents at this position due to the changing electromagnetic fields. This is another embodiment of a planar electric generator using a magnetic levitation system, which is specifically as follows:

As shown in FIG. 6, the planar electric generator using a magnetic levitation system includes a straight-line ferromagnetic guide rail 6 and a train (not shown) located above the straight-line ferromagnetic guide rail 6. The train and the straight-line ferromagnetic guide rail 6 cooperate to generate a magnetic levitation force and propelling force. The straight-line ferromagnetic guide rail 6 includes cross-ties 4, two straight-line wheel rails 5 separated from each other protrude upward from the cross-ties 4, and a plurality of first electromagnets 13 used for generating the magnetic levitation force protrudes between the two straight-line wheel rails 5. The first electromagnets 13 are distributed at an equal interval along a longitudinal direction of the straight-line ferromagnetic guide rail 6. An electromagnetic induction apparatus 14 used for generating electricity is provided at the top of each first electromagnet 13. The first electromagnets 13 and the electromagnetic induction apparatuses 14 form a first straight-line electricity-generation ferromagnetic guide rail. Wheels that are respectively in rolling cooperation with the straight-line wheel rails 5 are installed at two sides of the bottom of the train. Second electromagnets 22 that directly generate the magnetic levitation force and propelling force with the first electromagnets 13 protrude downward between the wheels at two sides of the bottom of the train. The second electromagnets 22 extend along the longitudinal direction of the train to form a second straight-line electricity-generation ferromagnetic guide rail. Magnetic field lines are generated between the first electromagnets 13 and the second electromagnets 22. The magnetic field lines pass through the electromagnetic induction apparatuses 14. A straight-line electricity generation component is formed. A trumpet-shaped wind catching cup is fixed at the top of the train. An opening direction of the wind catching cup is opposite a travel direction of the train.

The wind catching cup pushes, under the effect of an external wind force, the train to start along the longitudinal direction of the straight-line ferromagnetic guide rail 6. The wheels are in rolling cooperation with the straight-line wheel rails 5. Next, the train moves along the longitudinal direction of the straight-line ferromagnetic guide rail 6 under the effects of the magnetic levitation force and propelling force of the first electromagnets 13 and the second electromagnets 22. Changes occur to the magnetic field lines passing through the electromagnetic induction apparatuses 14, so that an electromotive force is generated to generate electricity. Electric energy is recycled for driving magnetic levitation of the train. The train is levitated above the straight-line ferromagnetic guide rail 6, and the wheels leave the straight-line wheel rails 5.

The straight-line ferromagnetic guide rail 6 is equivalent to the annular ferromagnetic guide rail 1 in Embodiment 1. The train is equivalent to the rotary disk 2 in Embodiment 2. The cross-ties 4 are equivalent to the annular base 11 in Embodiment 1. An electricity generation principle in the planar electric generator using a magnetic levitation system in this embodiment is the same as the electricity generation principle in Embodiment 1.

The foregoing planar electric generator using a magnetic levitation system may be auxiliary added at the bottom of a multiple unit train, a tram or a metro train. One magnetic levitation track rail may be added at a middle or central position of a railway track in which original two rails are fixed on cross-ties. First electromagnets and electromagnetic induction apparatuses that are placed between two rails on the cross-ties are stators of electric generators. Second electromagnets act as a row of rotators and are installed in the center of two wheels at the bottom of each car or two track rails, so as to form a track-type magnetic levitation electricity generation system. When the train travels forward, a series of track-type magnetic levitation electricity generation systems placed in the train generate electricity during the travel. The electricity is fed back to electric power for consumption by the train, so as to enable the train to save power. The magnetic levitation electricity generation system track rail does not exert an effect of pulling the train to travel forward, and instead performs recharging to produce a magnetic levitation state to enable the train to levitate and achieve an effect of reducing power consumption. In short, it is a "half-magnetic levitation and half-mechanical energy electric power train." A lifting effect of magnetic levitation is added to a mechanical braking system for a multiple unit train. The magnetic levitation provides a series of electricity generation systems with an advantage of continuously generating electricity during travel, so as to achieve a hybrid-power train. The planar electric generator can be mounted at the bottom of a multiple unit train, the bottom of a metro train, and further at the bottom of a conventional diesel-driven train, so that in addition to making a train stable and light and generating electricity for use, another group of electric generators does not need to be added when a battery is added on a train for use as electric power.

The foregoing embodiment is only a preferred embodiment of the present patent application and cannot be used to define the protection scope of the present patent application. Any nonessential change and replacement made by a person skilled in the art on the basis of the present patent application shall fall within the protection scope that the present patent application.

The invention claimed is:

1. A planar electric generator comprising:
   an annular ferromagnetic guide rail comprising:
      an annular base;
      two annular wheel rails separated from each other;
      a plurality of first electromagnets; and
      a plurality of electromagnetic induction apparatuses for generating electricity positioned at a top of each first electromagnets; and
   a rotary disk located above the annular ferromagnetic guide rail, the rotary disk comprising:
      two wheels in rolling cooperation with the annular wheel rails and being respectively installed at two sides of a bottom of the rotary disk;
      a plurality of second electromagnets; and
      a plurality of trumpet-shaped wind catching cups being fixed at a top of the rotary disk;
   wherein the rotary disk and the annular ferromagnetic guide rail cooperate to generate a magnetic levitation force and propelling force;
   wherein the two annular wheel rails protrude upward from the annular base; the first electromagnets protrude between the two annular wheel rails, the second electromagnets protrude downward between the two wheels; the first electromagnets and the second electromagnets generate magnetic field lines passing through the electromagnetic induction apparatuses;
   wherein the wind catching cups collectively guide wind for use as a driving force on the rotary disk, and an opening direction of each wind catching cups is tangent to a circumferential direction of the annular base;
   wherein the wind catching cups push the rotary disk to start to rotate along the circumferential direction of the annular base under the effect of an external wind force; the wheels and the annular wheel rails are in rolling cooperation; the rotary disk rotates along the circumferential direction of the annular base under the effects of the magnetic levitation force of the first electromagnets and the second electromagnets and a propelling force on the wind catching cups from wind; and
   wherein the magnetic field lines passing through the electromagnetic induction apparatuses change to produce an electromotive force to generate electricity and recycle electric energy for driving magnetic levitation of a train; and the rotary disk is levitated above the annular ferromagnetic guide rail, and the wheels leave the annular wheel rails.

2. The planar electric generator according to claim 1, wherein the rotary disk is an integral continuous annular disk, the second electromagnets are distributed at an equal interval at the bottom of the rotary disk around the circumferential direction of the rotary disk, and the interval between adjacent second electromagnets is equal to an interval between adjacent first electromagnets.

3. The planar electric generator according to claim 2, wherein the wind catching cups are odd-numbered and are distributed at an equal interval around the circumferential direction of the rotary disk, and the wind catching cups are axially symmetric about a central axis of the rotary disk.

4. The planar electric generator according to claim 1, further comprises a plurality of rotary disks which are odd-numbered; and the rotary disks are distributed at an interval around the circumferential direction of the annular base, and each of the wind catching cups is fixed at a top of each rotary disk.

5. The planar electric generator according to claim 4, wherein the second electromagnets are respectively distributed at an equal interval at a bottom of each rotary disk around the circumferential direction of the annular base, and the interval between adjacent second electromagnets is equal to an interval between adjacent first electromagnets.

6. The planar electric generator according to claim 4, wherein a plurality of first permanent magnets are respectively provided at a front end and a rear end in a circumferential rotation direction of the rotary disk, and opposing ends of two first permanent magnets on adjacent rotary disks repel each other.

7. The planar electric generator according to claim 1, wherein the electromagnetic induction apparatus comprises a double-sided electromagnet and an electric generator component.

8. The planar electric generator according to claim 1, wherein the two annular wheel rails and the annular base are integrated and are both second permanent magnets; symmetric protective wings protrude downward outside the wheels of the rotary disk, a plurality of third permanent magnets are provided at inner sides of the two protective wings and a bottom surface of the rotary disk, and opposing ends of the third permanent magnet and the second permanent magnet repel each other.

9. The planar electric generator according to claim 1, further comprising a wind accumulation funnel for accumulating an external wind flow being provided outside the annular ferromagnetic guide rail, and wherein the wind accumulation funnel comprises a big opening facing outward and a small opening facing a top of the rotary disk.

10. A planar electric generator comprising:
   a straight-line ferromagnetic guide rail comprising:
      a plurality of cross-ties;
      two straight-line wheel rails separated from each other;

a plurality of first electromagnets; and a plurality of electromagnetic induction apparatuses for generating electricity being provided at a top of each first electromagnet; and a train located above the straight-line ferromagnetic guide rail, the train comprising:

two wheels that are respectively in rolling cooperation with the straight-line wheel rails being installed at two sides of the bottom of the train;

a plurality of second electromagnets; and a trumpet-shaped wind catching cup being fixed at a top of the train;

wherein the train and the straight-line ferromagnetic guide rail cooperate to generate a magnetic levitation force and propelling force;

wherein the two straight-line wheel rails protrude upward from the cross-ties, the first electromagnets protrude between the two straight-line wheel rails; the first electromagnets are distributed at an equal interval along a longitudinal direction of the straight-line ferromagnetic guide rail; the first electromagnets and the electromagnetic induction apparatuses form a first straight-line electricity-generation ferromagnetic guide rail;

wherein the second electromagnets and the first electromagnets generate the magnetic levitation force and the propelling force, the second electromagnets protrude downward between the wheels at two sides of the bottom of the train, the second electromagnets extend along a longitudinal direction of the train to form a second straight-line electricity-generation ferromagnetic guide rail;

wherein the first electromagnets correspond to the second electromagnets; the first electromagnets and the second electromagnets produce magnetic field lines; the magnetic field lines pass through the electromagnetic induction apparatuses to form a straight-line electricity generation component;

wherein an opening direction of the wind catching cup is opposite a travel direction of the train; and wherein the wind catching cup pushes the train to start to rotate along the longitudinal direction of the straight-line ferromagnetic guide rail under the effect of an external wind force; the wheels and the straight-line wheel rails are in rolling cooperation; the train moves along the longitudinal direction of the straight-line ferromagnetic guide rail under the effects of the magnetic levitation force and propelling force of the first electromagnets and the second electromagnets; the magnetic field lines passing through the electromagnetic induction apparatuses change to generate an electromotive force to generate electricity and recycle electric energy for driving magnetic levitation of the train; and the train is levitated above the straight-line ferromagnetic guide rail, and the wheels leave the straight-line wheel rails.

* * * * *